United States Patent

Greathouse

[15] 3,667,432
[45] June 6, 1972

[54] ENGINE AIR MANIFOLD

[72] Inventor: Jack F. Greathouse, Hagerstown, Md.
[73] Assignee: Mack Trucks, Inc., Allentown, Pa.
[22] Filed: May 4, 1970
[21] Appl. No.: 31,872

Related U.S. Application Data

[63] Continuation of Ser. No. 704,636, Feb. 12, 1968, abandoned.

[52] U.S. Cl. .......................................... 123/52 M
[51] Int. Cl. ............................................ F02b 75/18
[58] Field of Search ........ 123/52 M, 52 MV, 52 MB, 52 ML, 123/52 MC, 195 S, 59 PC

[56] References Cited

UNITED STATES PATENTS

| | | |
|---|---|---|
| 1,224,852 | 5/1917 | Caldwell..............................123/52 M |
| 1,249,647 | 12/1917 | McFarland..........................123/52 M |
| 1,440,592 | 1/1923 | Gile......................................123/52 M |

FOREIGN PATENTS OR APPLICATIONS

| | | |
|---|---|---|
| 369,784 | 3/1932 | Great Britain.......................123/52 M |
| 532,985 | 2/1941 | Great Britain.......................123/52 M |
| 61,883 | 12/1954 | France ................................123/52 M |
| 951,895 | 4/1949 | France ................................123/52 M |

*Primary Examiner*—Wendell E. Burns
*Attorney*—Brumbaugh, Graves, Donohue & Raymond

[57] ABSTRACT

A manifold for a multi-cylinder internal combustion engine including a hollow manifold casing having an air inlet connection and a barrier plate on one side thereof provided with ports aligned with the intake passages of the engine, the manifold being mounted on the engine block or cylinder head with the barrier plate spaced from the head or block to enable an insulating barrier of air to be maintained between the barrier plate of the manifold and engine for reducing the transfer of heat from the engine to the air admitted into the engine cylinders, and openings through the baffle plate allowing air to flow from the passageway to the ports.

5 Claims, 5 Drawing Figures

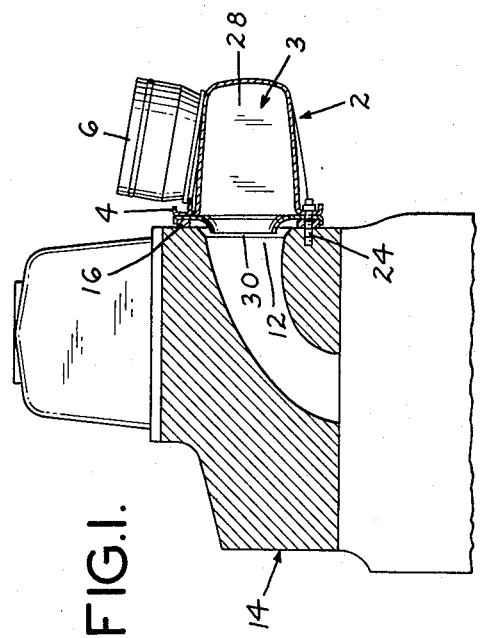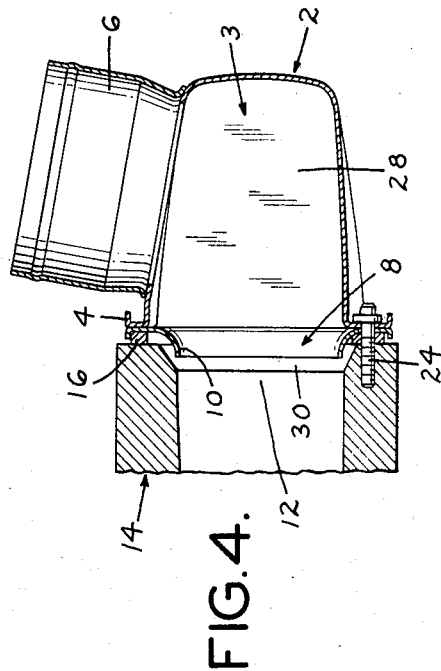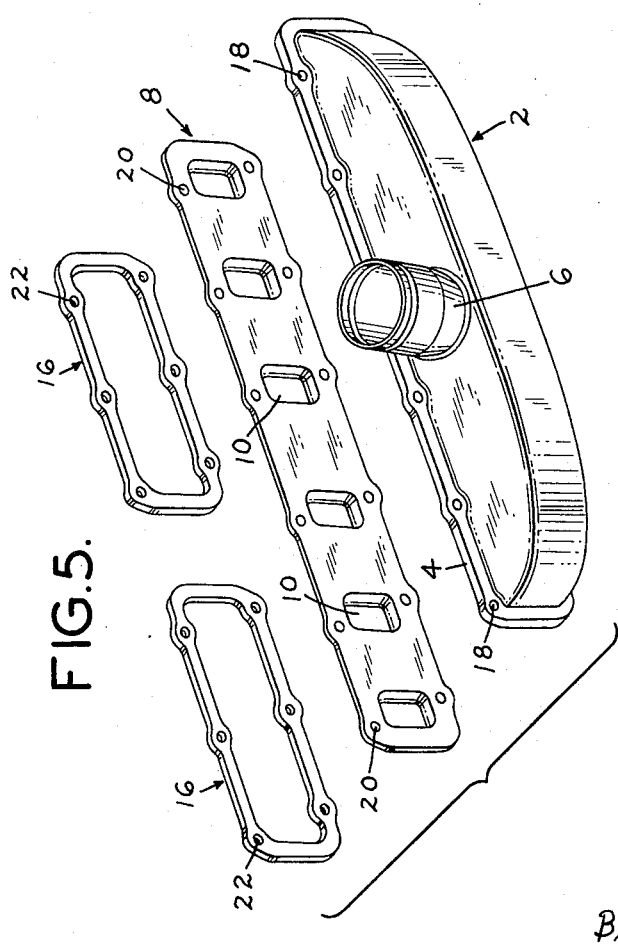

INVENTOR
JACK F. GREATHOUSE
BY
Brumbaugh, Free, Graves & Donohue
HIS ATTORNEYS

ENGINE AIR MANIFOLD

This application is a continuation of application Ser. No. 704,636, filed Feb. 12, 1968, now abandoned.

BACKGROUND OF THE INVENTION

This invention relates to internal combustion engine manifolds. In particular, it relates to an air intake manifold which is compact and minimizes heat conduction to the air flowing therethrough.

The inlet manifolds for internal combustion engines are of two general types. In one type of manifold, the manifold passages are formed in the cylinder head or the block of the engine during the casting of these components and the open outer side of the manifold passage is covered by a bolted-on plate and gasket, the plate being provided with a connection or inlet which is connected to a source of air or air and fuel, such as a carburetor, turbocharger or the like. This type of manifold construction is inexpensive but has the disadvantage that the air flowing through the manifold is heated to a relatively higher temperature by direct contact with the heated walls of the block or cylinder head and as a consequence the power output of the engine is noticeably reduced.

A more efficient type of manifold consists of a cast or otherwise formed manifold having branches which are connected to the inlet passages of the engine but is other-wise spaced from the block or head of the engine so that air can circulate around the manifold, thereby enabling the temperature of the air or mixture of fuel and air to be maintained lower prior to introduction into the cylinders with the resulting higher horsepower output of the engine. The latter type of inlet manifold, of course, is generally more expensive to produce and occupies substantial underhood space in the vehicle.

In accordance with the present invention, an improved manifold is provided which is easily and cheaply manufactured and thus is competitive with the cast-in type of manifold but has the advantages of the outside mounted manifold in avoiding overheating of the air supplied to the engine for combustion.

More particularly, in accordance with the invention, the manifold includes a hollow casing formed of sheet metal or as a lightweight casting which spans a plurality of the air inlet ports, and is provided with a barrier plate on the side adjacent to the engine which is maintained in spaced relation to the block or cylinder head of the engine by means of an interposed gasket or by means of projecting flanges so that an insulating air space is maintained between the barrier plate and the side of the engine. Suitable ports or openings are provided in the barrier plate for admitting air into the cylinders, these openings being in the form of tubular or flared extensions aligned substantially with the inlet ports of the engine and disposed so that direct heat transfer from adjacent engine structure does not take place between the tubular elements and the block or cylinder head. Inasmuch as the manifold has its major surface areas exposed and the portions directly adjacent to the head or block insulated therefrom by the air space and gasket, the temperature of the combustion supporting air is not increased unduly during the operation of the engine. The new manifold is of more compact and less complex design than the exterior mounted manifolds heretofore used and can be formed of different and more conveniently worked materials so that it is competitive in price with the integral or cast-in manifolds and is at least equal to exterior mounted manifolds in avoidance of transfer of engine heat to the air supplied to the cylinders.

For a better understanding of the present invention, reference may be made to the accompanying drawings, in which FIG. 1 is an elevational view taken in cross-section through a portion of the engine block showing the assembled relationship between a manifold in accordance with the invention and an inlet port;

FIG. 4 is a view in cross-section taken generally along the line 4—4 of FIG. 2, looking in the direction of the arrows; and FIG. 5 is an exploded view in perspective of the manifold of FIG. 1, showing the parts thereof.

DESCRIPTION OF THE PREFERRED EMBODIMENTS

Figure 2:
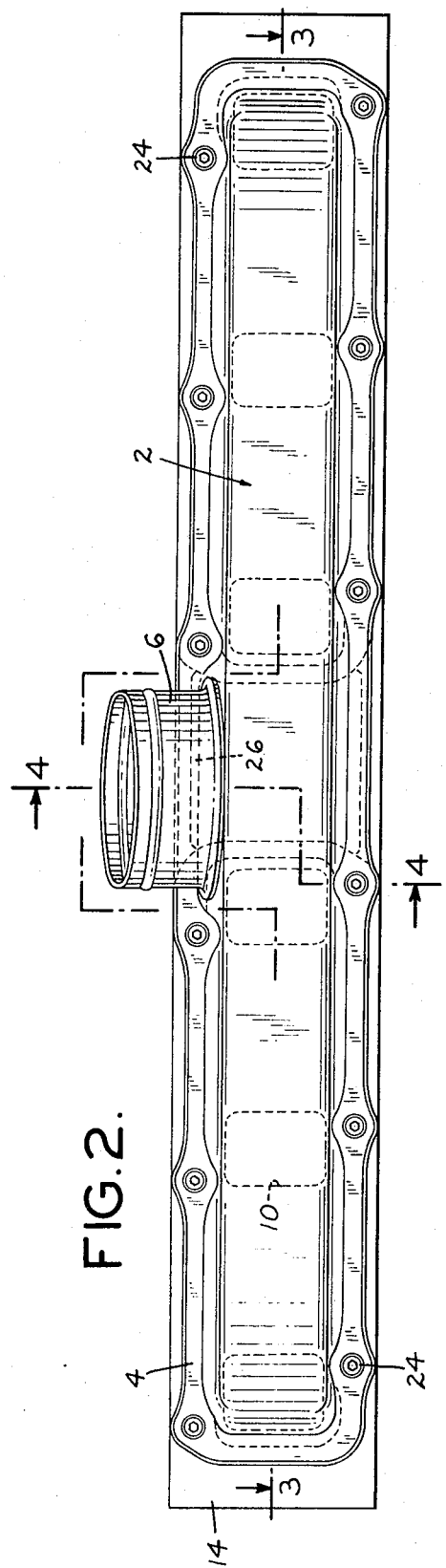
FIG. 2 is a front elevational view of the manifold shown in FIG. 1.
Figure 3:
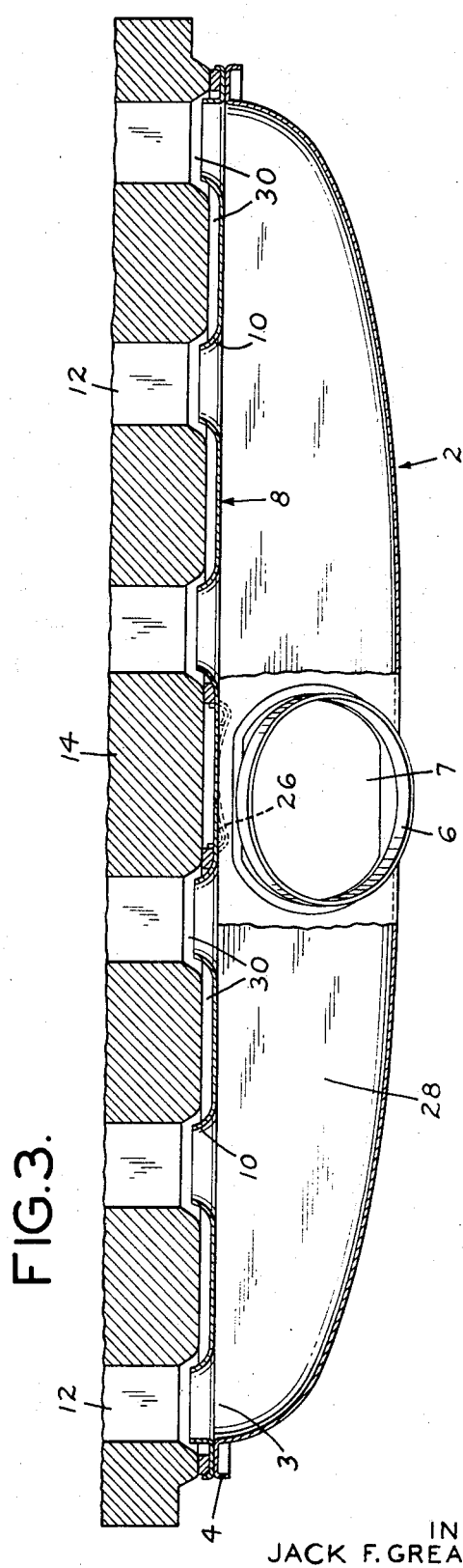
FIG. 3 is a view in cross-section taken generally along the line 3—3 of FIG. 2, looking in the direction of the arrows.

The manifold 2 shown in the figures includes an open-sided casing 3 having a peripheral flange 4 extending around the open side. An air inlet pipe or coupling 6 extends from an opening 7 within one of the walls of the member 2, and is adapted to connect the casing to a carburetor, supercharger, tubocharger or other air source. A barrier plate 8 mates with the peripheral flange 4 and covers the open side of the casing 3. The plate can be separate from or welded or otherwise secured to the casing. A plurality of short tubes or flared extensions are formed on the barrier plate 8 and are aligned with and extend into the respective air inlet ports 12 when the manifold is fastened to the cylinder head or block 14. The casing 2, the inlet pipe 6 and the baffle plate 8 may be made of any suitable material, such as drawn or stamped sheet steel, cast steel or iron or non-ferrous metal such as aluminum.

Two insulating, sealing and spacing gaskets 16 are interposed between the barrier plate 8 and the cylinder head or block. A plurality of bolt or screw-receiving holes 18, 20 and 22 extend through the peripheral flange 4, the barrier plate 8 and the spacer gaskets 16, respectively.

The spacer gaskets 16 are positioned against smooth or machined surfaces of the engine 14 surrounding the inlet ports 12 and the barrier plate 8 and the casing 2 are secured against the gaskets 16 by means of screws 24 passing through the aligned holes 18, 20 and 22 and engaging threaded holes in the engine 14 to hold the manifold in position. A spacing clip 26 may be placed between the two gaskets 16 to assure that they remain fixed in their relative positions. If desired, insulation may be introduced into the space between the barrier plate and the cylinder head or block instead of using air space alone as an insulating medium.

Inasmuch as the barrier plate 8 is spaced from the engine block or head by the gaskets 16, an air space is present between the plate and the engine which keeps the barrier plate cooler than the block or head. The outer walls of the casing 2 are exposed to the air under the vehicle hood and consequently the entire manifold and the air passing through it are maintained at a lower temperature than is possible with manifolds which are formed, at least in part, in the block or cylinder head with resulting improvement in engine efficiency.

Inasmuch as the manifold is of open hollow configuration and can be made of sheet metal if desired by a simple pressing or stamping operation or by casting, it can be made either as a single piece or two readily assembled parts for ready attachment to the engine. The advantages of cost which are found with the built-in or cast-in manifold are readily achieved while at the same time the low heat transference which characterizes the outside attached manifold are achieved and at substantially lower cost, especially with respect to machining operations and the like which are necessary to attach the outside mounted manifold to the engine.

The above-described embodiment of the invention is merely exemplary and variations and modifications thereof may be made by those skilled in the art without departing from the spirit and scope of the invention. For example, the manifold may be a single cast piece with the barrier plate integral therewith or may be a welded or brazed assembly. Also, instead of a pair of gaskets 16, a single gasket extending around the entire periphery of the barrier plate may be used. Furthermore, the barrier plate need not be designed to engage with the inner peripheral surface of the casing 2, but may be recessed into the casing 2 enabling a thinner gasket or gaskets to be used. Accordingly, all such variations and modifications are intended to be within the scope of the invention as defined in the appended claims.

I claim:

1. A manifold for supplying air to a multi-cylinder internal combustion engine comprising a hollow casing forming a chamber having a side opposing said engine, a barrier plate spanning said side and overlying the air inlet passages of the engine, openings in said barrier plate in alignment with said passages, said openings comprising tubular extensions which extend into said air inlet passages, said tubular extensions being disposed in spaced gasketless relation to said engine to minimize heat transfer from said engine to said tubular extensions, means for mounting said casing on said engine with said barrier plate spaced from said engine to minimize the transfer of heat from said engine to the air supplied to said air inlet passages, said mounting means comprising means disposed between said engine and said casing in spaced relation to said inlet passages for sealing at least one insulating barrier of air between said engine and said barrier plate from the air surrounding said manifold, and means for coupling said manifold to an air source.

2. A manifold in accordance with claim 1 in which said sealing means comprises at least one gasket.

3. The manifold set forth in claim 1 comprising an insulating medium disposed in substantially all of the space between said engine and said barrier plate laterally of said barrier plate openings.

4. A manifold for supplying air to a multi-cylinder internal combustion engine comprising a hollow casing forming a chamber having a side opposing said engine, a barrier plate spanning said side and overlying the air inlet passages of the engine, openings in said barrier plate in communication with said passages, means for mounting said casing on said engine with said barrier plate spaced from said engine to minimize the transfer of heat from said engine to the air supplied to said air inlet passages, said mounting means comprising means disposed between and engaging said engine and said casing in spaced relation to said inlet passages for sealing at least one insulating barrier of air between said engine and said barrier plate from the air surrounding said manifold, the insulating barrier of air occupying substantially all of the space between said engine and said barrier plate laterally of said barrier plate openings, and means for coupling said manifold to an air source.

5. The manifold set forth in claim 4 in which said openings are formed to promote the flow of air into said air inlet passages.

* * * * *